US 12,495,304 B2

United States Patent
Rakshit et al.

(10) Patent No.: US 12,495,304 B2
(45) Date of Patent: Dec. 9, 2025

(54) CONTEXT AWARE INVOLVING MOBILE PHONE WITH VEHICLE TO ENHANCE VEHICLE TO VEHICLE COMMUNICATION NETWORK STRENGTH

(71) Applicant: INTERNATIONAL BUSINESS MACHINES CORPORATION, Armonk, NY (US)

(72) Inventors: Sarbajit K. Rakshit, Kolkata (IN); Sudheesh S. Kairali, Kozhikode (IN); Sudhanshu Sekher Sar, Bangalore (IN); Satyam Jakkula, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 17/932,355

(22) Filed: Sep. 15, 2022

(65) Prior Publication Data

US 2024/0098505 A1 Mar. 21, 2024

(51) Int. Cl.
| | | |
|---|---|---|
| *H04W 16/04* | (2009.01) | |
| *H04W 8/00* | (2009.01) | |
| *H04W 84/00* | (2009.01) | |
| *H04W 84/12* | (2009.01) | |

(52) U.S. Cl.
CPC ........... *H04W 16/04* (2013.01); *H04W 8/005* (2013.01); *H04W 84/005* (2013.01); *H04W 84/12* (2013.01)

(58) Field of Classification Search
CPC ... H04W 16/04; H04W 8/005; H04W 84/005; H04W 84/12
See application file for complete search history.

(56) References Cited

U.S. PATENT DOCUMENTS

| | | | | |
|---|---|---|---|---|
| 2013/0034020 A1* | 2/2013 | Morgan | ................ | H04W 84/14 370/255 |
| 2017/0034847 A1* | 2/2017 | He | ........................ | H04W 74/06 |
| 2018/0033303 A1 | 2/2018 | Park | | |
| 2022/0082395 A1* | 3/2022 | Sasaki | ..................... | H04W 4/46 |

(Continued)

FOREIGN PATENT DOCUMENTS

| | | |
|---|---|---|
| CN | 107454128 B | 12/2017 |
| CN | 111698662 B | 10/2021 |

(Continued)

OTHER PUBLICATIONS

"Automotive Industry Solutions", IBM, Last Updated Sep. 30, 2021, 14 pgs., <https://w3.ibm.com/w3publisher/automotive-industryhub/solutions>.

(Continued)

*Primary Examiner* — Hashim S Bhatti
(74) *Attorney, Agent, or Firm* — Kelsey M. Skodje

(57) ABSTRACT

A method comprising establishing a local communication network among and between a plurality of onboard vehicle computers respectively located in a plurality of vehicles, polling the vicinity of each vehicle to determine a set of qualified mobile device(s) that meet the following criteria: (i) the qualified mobile device is located within one of the vehicles of the plurality of vehicles, (ii) the qualified mobile device is configured and equipped to join the local network, and (iii) the qualified mobile device consents to join the local network, and adding the set of qualified mobile device(s) to the local network.

18 Claims, 4 Drawing Sheets

(56) References Cited

U.S. PATENT DOCUMENTS

2022/0394516 A1* 12/2022 Shire .............. H04W 4/80
2023/0306404 A1* 9/2023 Polasa .............. G06Q 20/401

FOREIGN PATENT DOCUMENTS

CN   110546958 B    1/2022
WO   2017027355 A1  2/2017

OTHER PUBLICATIONS

"Cellular Vehicle-to-Everything (C-V2X)", GSMA, 2007, 20 pgs., <https://www.gsma.com/iot/wp-content/uploads/2017/12/C-2VX-Enabling-Intelligent-Transport_2>.

Choudhary, M., "How Self-Driving Cars Communicate for Seamless Driving", GW Prime, Sep. 3, 2019, 7 pgs., <https://www.geospatialworld.net/blogs/how-self-driving-cars-communicate-for-seamless-driving/>.

Dahlman, et al., "Vehicle-to-Vehicle Communication", ScienceDirect, Downloaded from the Internet on Aug. 17, 2022, 33 pgs., <https://www.sciencedirect.com/topics/computer-science/vehicle-to-vehicle-communication>.

Dey, et al., "Modified PHY Layer for High Performance V2X Communication using 5G NR", 2020 11th IEEE Annual Ubiquitous Computing, Electronics & Mobile Communication Conference (UEMCON), Oct. 2020, 6 pgs., doi: 10.1109/UEMCON51285.2020.9298144.

Diewald, et al., "Mobile Device Integration with V2X Communication", 19th ITS World Congress, Oct. 22-26, 2012, Vienna, Austria, 9 pgs.

Disclosed Anonomously, "Context Aware Connected Vehicle Network Creation and Management", An IP.com Prior Art Database Technical Disclosure, IP.com No. IPCOM000268677D, IP.com Electronic Publication Date: Feb. 15, 2022, 4 pgs.

* cited by examiner

CONTEXT AWARE INVOLVING MOBILE PHONE WITH VEHICLE TO ENHANCE VEHICLE TO VEHICLE COMMUNICATION NETWORK STRENGTH

BACKGROUND

The present invention relates generally to the field of local and/or short range vehicle-to-vehicle communication.

One traditional vehicle-to-vehicle communication network was implemented by a technology called citizens' band radios. These devices were not computer based, but rather, were special purpose radios designed to communicate voice signals between passengers of nearby vehicles and/or local citizens' band devices located in homes and/or businesses. More modern vehicle-to-vehicle communication networks are computer based and use conventional computer-to-computer communication technology and protocols.

The Wikipedia entry for "vehicular communication systems" (as of Aug. 24, 2022) states, in part, as follows: "Vehicular communication systems are computer networks in which vehicles and roadside units are the communicating nodes, providing each other with information, such as safety warnings and traffic information. They can be effective in avoiding accidents and traffic congestion. Both types of nodes are dedicated short-range communications (DSRC) devices. DSRC works in 5.9 GHz band with bandwidth of 75 MHz and approximate range of 300 metres (980 ft). Vehicular communications is usually developed as a part of intelligent transportation systems (ITS). The main motivation for vehicular communication systems is safety and eliminating the excessive cost of traffic collisions. Over the years, there have been considerable research and projects in this area, applying VANETs [vehicular ad hoc networks] for a variety of applications, ranging from safety to navigation and law enforcement." (footnote(s) omitted)

SUMMARY

According to an aspect of the present invention, there is a method, computer program product and/or system that performs the following operations (not necessarily in the following order): (i) establishing a local communication network among an between a plurality of onboard vehicle computers respectively located in a plurality of vehicles; (ii) polling the vicinity of each vehicle to determine a set of qualified mobile device(s) that meet the following criteria: (i) the qualified mobile device is located within one of the vehicles of the plurality of vehicles, (ii) the qualified mobile device is configured and equipped to join the local network, and (iii) the qualified mobile device consents to join the local network; and (iii) adding the set of qualified mobile device(s) to the local network.

DETAILED DESCRIPTION

Figure 1A:
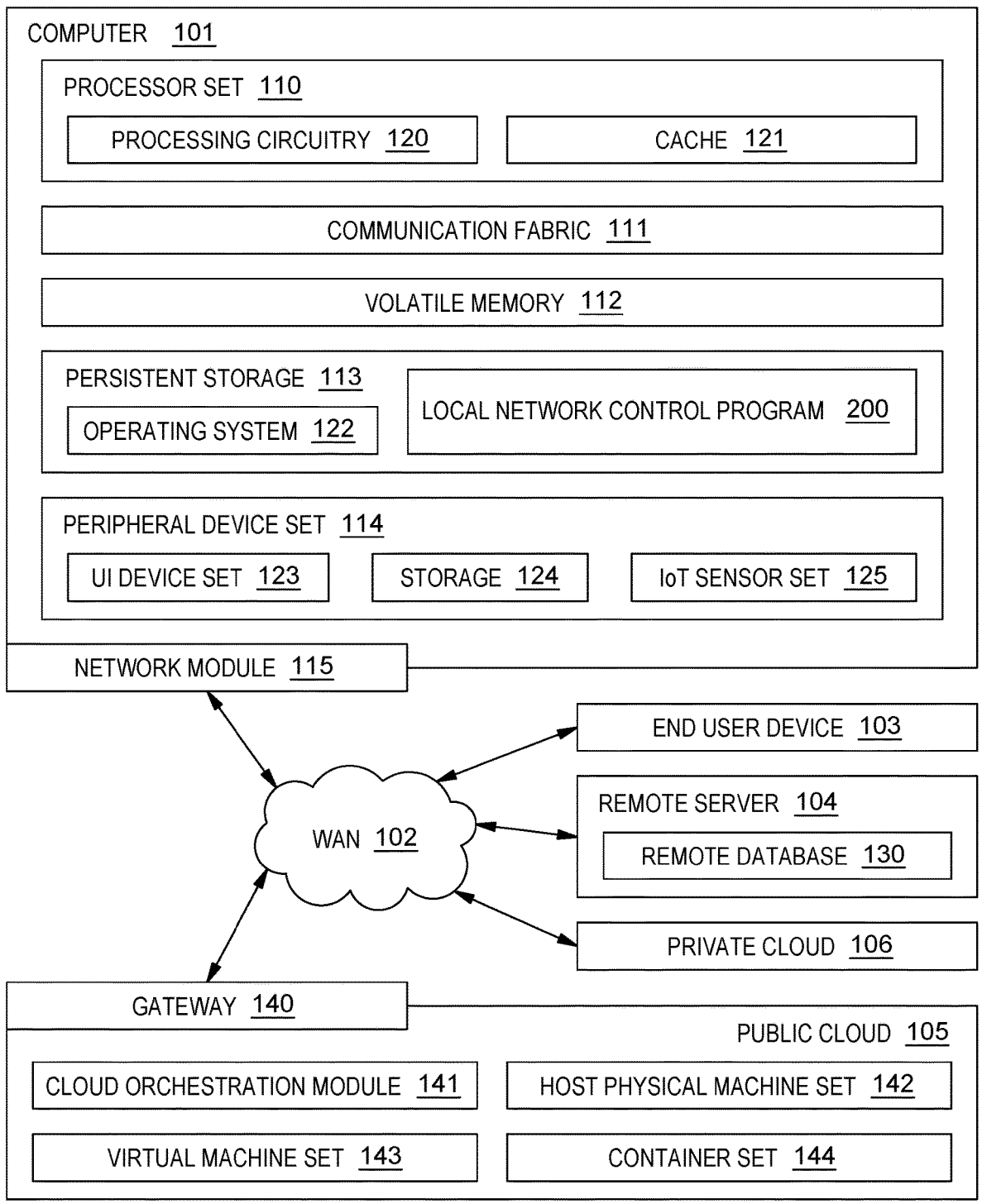
FIGS. 1A and 1B, taken together, form a block diagram of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. THE HARDWARE AND SOFTWARE ENVIRONMENT

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as local network control block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

II. EXAMPLE EMBODIMENT

Figure 1B:
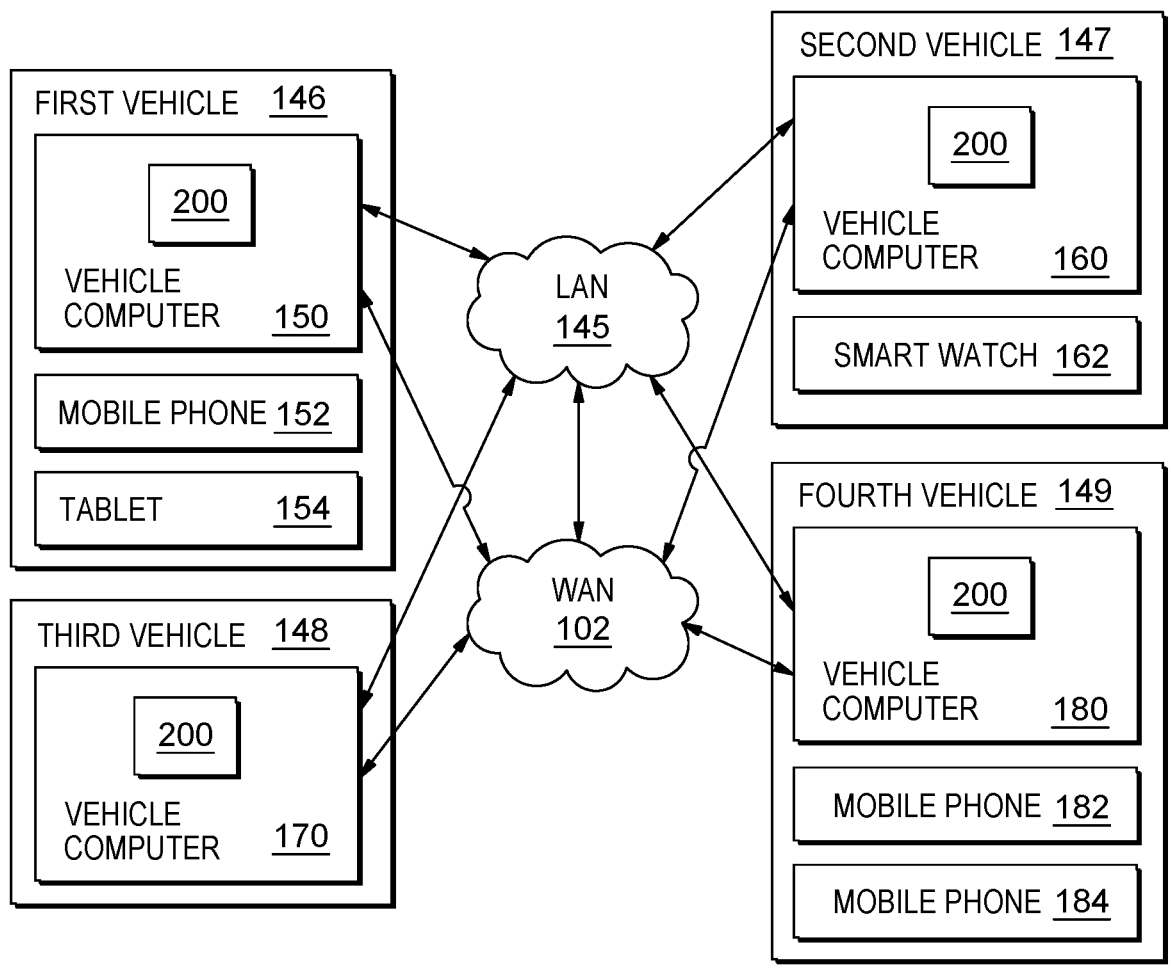
Figure 2:
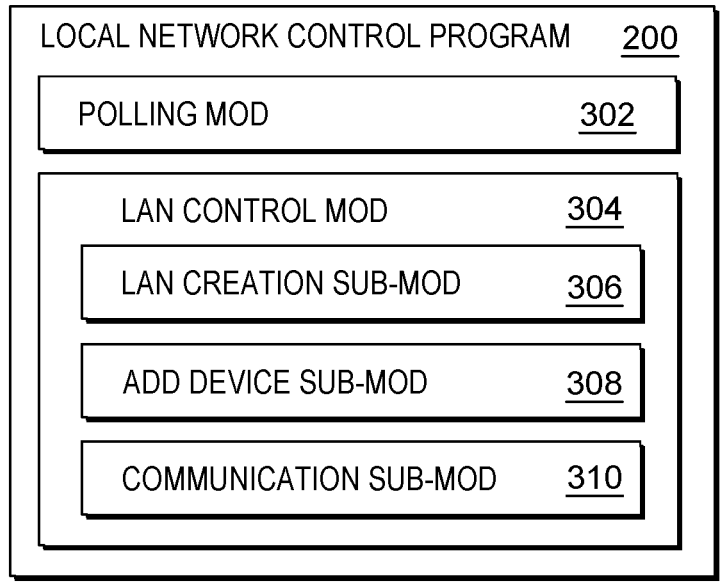
FIG. 2 is a block diagram showing a machine logic (for example, software) portion of the first embodiment system.
Figure 3:
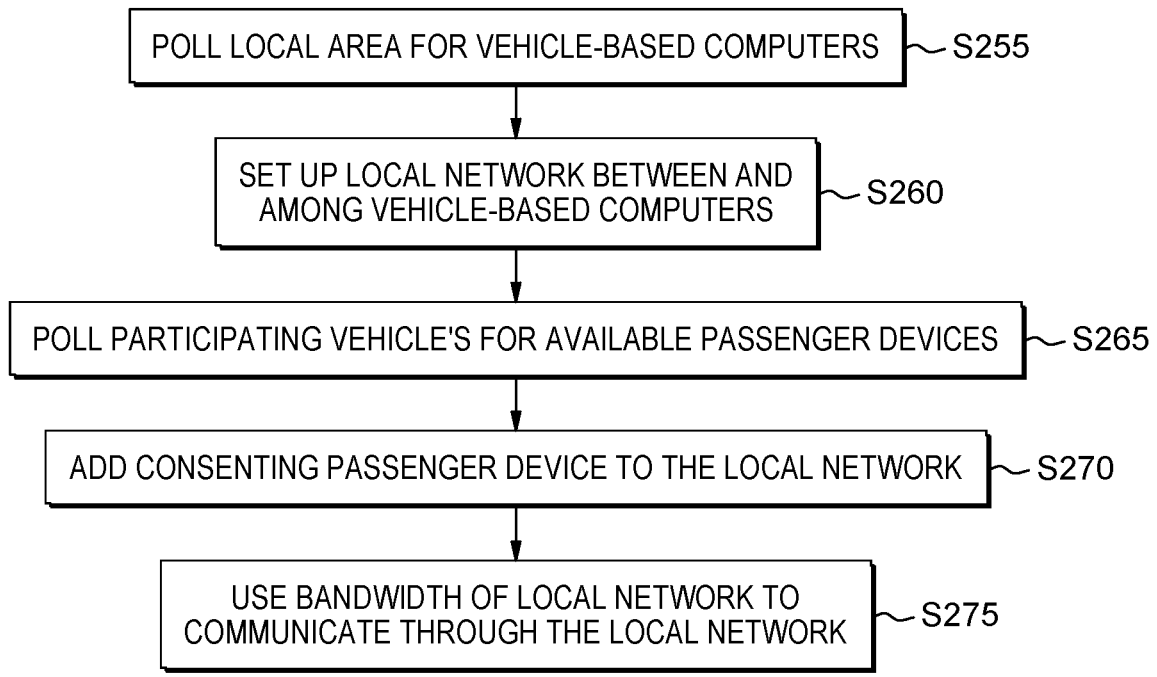
FIG. 3 is a flowchart showing a first embodiment method performed, at least in part, by the first embodiment system.

As shown in FIG. 1B, show further components of computing environment 100 as follows: local area network (LAN) 145; first vehicle 146 (including vehicle computer 150, mobile phone 152 and tablet device 154); second vehicle 147 (including vehicle computer 160 and smart watch 162); third vehicle 148 (including vehicle computer 170); and fourth vehicle 149 (including vehicle computer 180, mobile phone 182 and mobile phone 184). As shown in FIG. 3, flowchart 250 shows an example method according to the present invention, and computing environment 100 of FIGS. 1A and 1B is a computing environment in which the example method of flowchart 250 of FIG. 3 can be performed. At least some of the steps of this example method are performed by the computer code of block 200, which is shown in some detail in FIG. 2. As shown in FIG. 1B, four vehicles 146, 147, 148 and 149 have on-board computers that are running the software of local network control program block 200 (sometimes herein referred to as the "local network control program"). This means that these vehicles can form a local communication network among and between the vehicles for advantages such as enhanced communication between vehicles, secure communication between vehicles and sharing of computer resources among and between the vehicles. This method and associated software will now be discussed, over the course of the following paragraphs, with extensive reference to the blocks of FIGS. 1A through 3.

Processing begins at operation S255, where polling module ("mod") 302 of the copy of network control program in computer 150 of first vehicle 146 polls the local area as it is driving down the road. More specifically, mod 302 is polling for other vehicles and/or stationary stations (see, for example, block 200 in computer 101 in FIG. 1) that can and want to participate in a local network. In this example, the following computers respond affirmatively to the polling: vehicle computer 160 of second vehicle 147; vehicle computer 170 of third vehicle 148; and vehicle computer 180 of fourth vehicle 149. In this examples, these other computers 160, 170 and 180 are in vehicles being occupied by family members of the driver of first vehicle 146. The vehicles 146, 147, 148 and 149 are about to embark, in tandem, on a long road trip. That is why they want to set up a local area network among and between their respective vehicles. In this example, the vehicles are driven by humans. Alternatively, the vehicles could be autonomous vehicles.

Processing proceeds to operation S260, where the LAN creation sub-mod 306 of LAN control mod 304 of the copies of the local network control program respectively being run by computers 150, 160, 170 and 180 work co-operatively through WAN 102 to create LAN 145. At this point, computers 150, 160, 170 and 180 can communicate with each other through LAN 145. At this point, the four vehicles leave, in tandem, on their long road trip. In this embodiment, LAN 145 uses a Wi-Fi network for LAN communications. Alternatively, and as discussed in the next sub-section of this Detailed Description section, other types of local networks could be used.

Processing proceeds to operation S265, where polling mod 302 of the copy of the local network control program running in first vehicle 146 polls the vehicles involved in LAN 145 (that is vehicles 146, 147, 148 and 149) and determines whether any passenger devices are present and amenable to being brought into LAN 145. More specifically, in this example, it is determined through that is polling that: (i) mobile phone 152 is present in first vehicle 146, but does not want to join LAN 145; (ii) tablet 154 is present in first vehicle 146, and does want to join LAN 145; (iii) smart watch 162 is present in second vehicle 147 and does want to join LAN 145; (iv) no qualified mobile devices are present in third vehicle 148; (v) mobile phone 182 is present in fourth vehicle 149 but does not want to join LAN 145; and (vi) mobile phone 184 is present in fourth vehicle 149 and does want to join LAN 145. In this example, the various devices that qualify to join LAN 145 are mobile phones, tablets and/or smart watches. Additionally, or alternatively, any other type of mobile device (now known or to developed in the future), that is equipped and configured to communicate over WAN 102 and LAN 145, could be included.

Processing proceeds to operation S270, where add device sub-mod 308 of LAN control mod 304 of the copy of local network control program block 200 in vehicle computer 150 of first vehicle 146 adds the qualifying and consenting devices to LAN 145. In this embodiment, the mobile devices need to download an app before they can join 145 in order to better manage each device's respective participation in LAN 145. Alternatively, there may be no requirement to download any dedicated code to any of the mobile devices. In this embodiment, LAN 145 is a single LAN in which all devices (that is, in this example, computer 150, computer 160, computer 170, computer 180, computer 190, tablet 154, smart watch 162 and mobile phone 184) can participate equally. Alternatively, there may be "parallel networks" that isolate the vehicle onboard computers from the mobile devices, at least to some extent—this possibility is further discussed in the next sub-section of this Detailed Description section. An important point of terminology as used in this document: whether there is a single, unified local network, or multiple "parallel networks," either way is herein referred to as a "local network" (singular). In this embodiment Wi-Fi driven LAN 145 is the "local network."

Processing proceeds to operation S275, where communication sub-mod 310 of LAN control mod 304 of the copy of local network control program block 200 running on vehicle computer 150 of first vehicle 146 allows the mobile devices to communicate over LAN 145 as the four vehicles proceed, in tandem, down the road on their long road trip. While this embodiment has used the copy of block 200 located in the first vehicle to control most of the operations, this control function couple be performed by the copy of block 200 in any of the vehicles, or even a remote copy of block 200 (for example, see the copy of block 200 located in computer 101 of FIG. 1A).

In some embodiments, the mobile devices are used exclusively, or at least primarily, to provide extra communication bandwidth for the vehicle computers. For example, tablet 154 might download a movie through WAN 102 and then transfer the long movie file to vehicle computer 170 through LAN 145—this allows vehicle computer 170 to manage its limited bandwidth better. The use of the mobile devices to better manage bandwidth is further discussed in the next sub-section of this Detailed Description section.

III. FURTHER COMMENTS AND/OR EMBODIMENTS

A connected car is a car that can communicate bidirectionally with other systems outside of the car using a local area network (LAN). This allows the car to share internet access, and hence data, with other devices both inside and outside the vehicle. For safety-critical applications, it is anticipated that cars will also be connected using dedicated short-range communications (DSRC) or cellular radios, operating in the FCC-granted 5.9 GHz band with very low latency. Automotive-grade machine-to-machine (M2M) technology provides cellular internet of things (IoT) connectivity and new mobile lifestyles for both drivers and passengers offering high-speed, low latency connectivity, and a suite of advanced features including mobile Wi-Fi hotspot, Internet radio, Web services and an improved navigation system. In this case, each and every car present in the surrounding will communicate with each other using a network created among the cars.

Some embodiments of the present invention recognize one, or more, of the following facts, potential problems and/or potential areas for improvement with respect to the current state of the art: (i) in a vehicle to vehicle network, the vehicles are connected to other vehicles in the surrounding area with Wi-Fi or by using another connection mechanism; (ii) the network strength depends on the vehicles network capabilities; (iii) in various contextual situations, the vehicles may have to share additional data among the vehicles to account for various driving decisions; (iv) the vehicle network creation capability is typically pre-defined and fixed; and/or (v) there is typically a delay in communication among the vehicles.

Some embodiments of the present invention may include one, or more, of the following operations, features, characteristics and/or advantages: (i) on-demand hardware integration of a passenger's mobile phone with the vehicle hardware to enhance the vehicle to vehicle communication bandwidth; (ii) while vehicles are traveling down the road, and based on the change in contextual situations, if the vehicles identify additional data communication is required, or faster communication is required among the vehicles, then the vehicles will use the mobile devices of the respective passengers to create an additional parallel network among the vehicles along with the vehicle to vehicle default network; (iii) this parallel mobile phone communication network satisfies the additional communication bandwidth demand; and/or (iv) based on the data and information sharing requirement, or the speed of information being shared among the vehicles, the autonomous vehicles will gradually secure enough communication bandwidth from various participating mobile devices of the passengers.

A method embodiment of the present invention includes the following operations: (i) based on the contextual situation of the vehicle to vehicle communication network, the vehicles will classify the data and information and will identify which data and information can be shared with the vehicle to vehicle communication network, and which data can be shared with the mobile phone network by using the mobile devices of the passengers; (ii) uses blockchain to track how long the passenger's mobile devices are used to create parallel network connections among the vehicles based on any identified contextual need, and accordingly the passengers can get a discounted travel price; (iii) when any passenger onboards on any vehicle, the vehicles will identify the mobile devices of the passengers using near-field communication (NFC) and will proactively register the mobile devices of the passengers, based on the passenger's consent, so when additional network bandwidth is required, the vehicles can use parallel network connectivity; and/or (iv) if any vehicle is having any technical problem establishing vehicle to vehicle connectivity, the vehicle will dynamically use the mobile devices of the passengers to establish vehicle to vehicle connectivity or participate in any vehicle to vehicle network.

Figure 4:
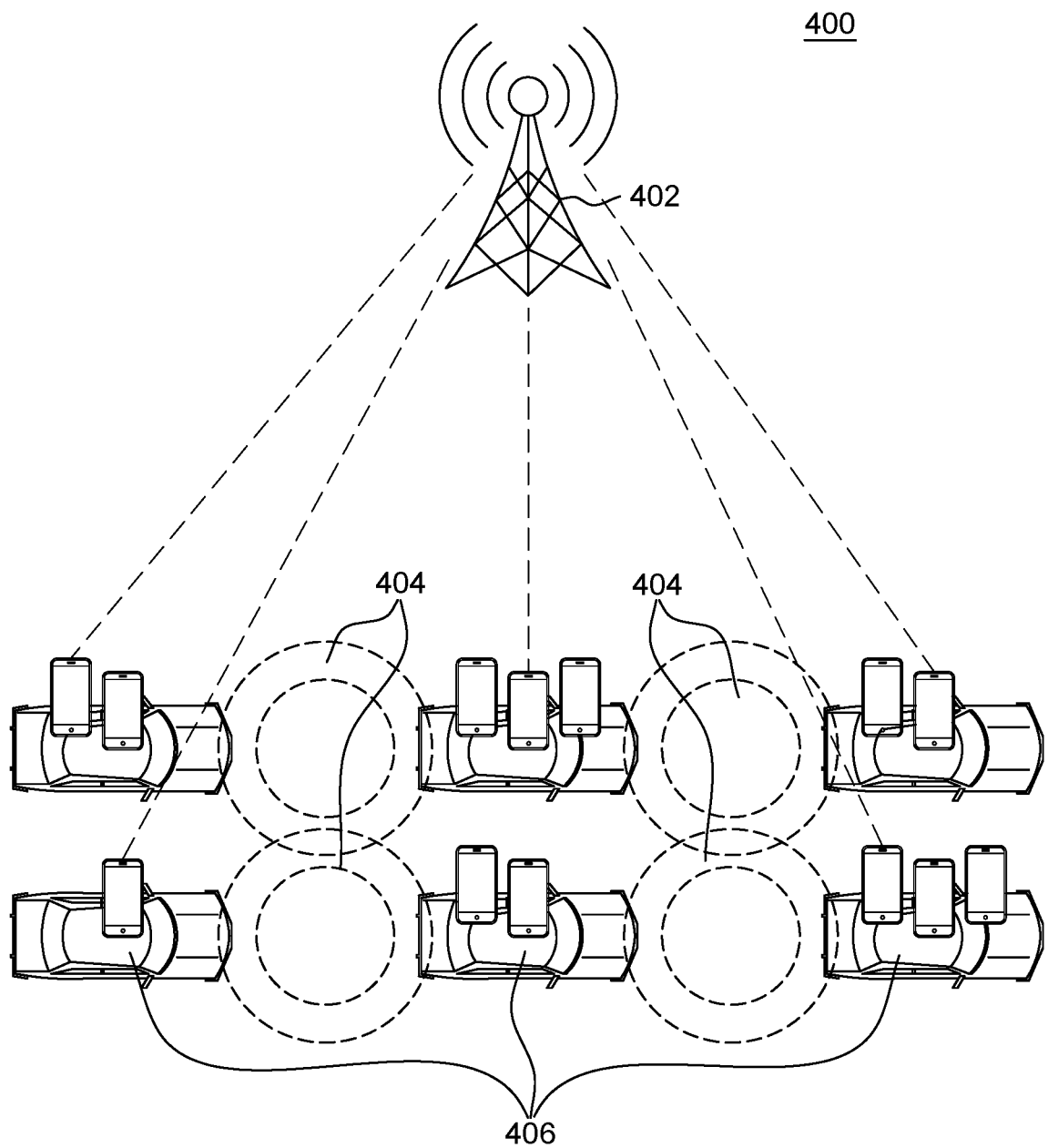
FIG. 4 is a block diagram of a second embodiment system.

FIG. 4, diagram 400 shows a vehicle to vehicle network that is created with vehicle hardware, and based on change in contextual situation, the vehicles will use the passenger's mobile devices to create a parallel network and will share the data transfer load. FIG. 4, diagram 400 includes: mobile phone tower 402; vehicle to vehicle network with vehicle hardware 404; and passengers' mobile devices 406. In addition, according to some embodiments of the present invention, mobile devices of the passengers, 406, create additional parallel networks along with a vehicle to vehicle network.

Some embodiments of the present invention may include one, or more, of the following operations, features, characteristics and/or advantages: (i) each and every vehicle is uniquely identified by a unique code; (ii) a computer in at least one of the vehicles is configured to create a vehicle to vehicle communication network; (iii) the on-board vehicular computers have an embedded subscriber identification module (eSIM) and the same will be used for vehicle to vehicle connectivity; (iv) each vehicle computer has a predefined network bandwidth capability which typically has a fixed maximum value; (v) when a passenger boards any vehicle, the vehicle will recognize the passengers' mobile phone using near-field communication (NFC); and/or (vi) the vehicle's computer sends notification to the onboarding passenger's mobile device to determine if the passenger is willing to allow the mobile device to create an additional network.

An embodiment of a method according to the present invention includes the following operations: (i) mobile devices can create additional connectivity with a telephonic network or wi-fi connectivity along with the vehicle to vehicle network; (ii) if the passenger gives consent, the mobile device will create a parallel network; (iii) uses blockchain to ensure the mobile device will dynamically get disconnected when the passenger leaves the vehicle; (iv) the blockchain will also be used for tracking if the mobile device of the passenger is used for creating a parallel network; (v) based on the passenger's consent, the mobile device will be part of the vehicle's hardware to create a vehicle to vehicle network; and/or (vi) the vehicles will communicate with other vehicles and will identify a contextual situation.

Some embodiments of the present invention may include one, or more, of the following operations, features, characteristics and/or advantages: (i) based on the identified contextual situation, identify the volume of data transfer among the vehicles; (ii) identify the network bandwidth requirement for vehicle to vehicle connectivity and speed of data sharing among the vehicles; (iii) the vehicles will evaluate if the network bandwidth for vehicle to vehicle network connectivity is sufficient; (iv) if the network bandwidth for vehicle to vehicle connectivity is not sufficient, the mobile phone's network as a parallel network will be used; and/or (v) the vehicles collaborate with each other to identify which data can be transferred through the vehicle to vehicle network and which data will be transferred through mobile network.

Some embodiments of the present invention may include one, or more, of the following operations, features, characteristics and/or advantages: (i) classifies the data; (ii) enables a mobile phone network as a parallel connectivity network; (iii) checks the data transfer and speed of data transfer needed during vehicle to vehicle connectivity; (iv) uses blockchain to identify how long passenger's mobile devices are used for creating network connectivity; and/or (v) identifies if any device is having a problem creating vehicle to vehicle network connectivity, during which time, a passengers mobile phone will be used for creating network connectivity.

Some embodiments relate to: (i) autonomous vehicles, and, more specifically, to connected vehicles, software defined vehicles and ADAS (advanced driver assistance systems)/autonomous driving; (ii) license value against technology companies working in this space; (iii) license value from existing autonomous companies; and/or (iv) in-line with focus on emerging technology/autonomous driving.

Some embodiments of the present invention may include one, or more, of the following operations, features, characteristics and/or advantages: (i) identifies the need for additional data communication among the vehicles for better connectivity and speed of connection; and/or (ii) creates an additional parallel network using the mobile devices of the respective passengers to enable vehicle to vehicle parallel connection to an existing default network.

Some embodiments of the present invention may include one, or more, of the following operations, features, characteristics and/or advantages: (i) contextually configures and selects mobile phones as a backup or secondary channel to complement existing V2V (vehicle-to-vehicle) communication depending on the classified data type and information; and/or (ii) is a value proposition for connected vehicles, software defined vehicles, and ADAS/autonomous driving which pivot a competitive advantage in the automotive industry.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

What is claimed is:

1. A computer-implemented method (CIM) comprising:
   establishing a local communication network among and between a plurality of onboard vehicle computers respectively located in a plurality of vehicles;
   polling the vicinity of each vehicle to determine a set of qualified mobile device(s) that meet the following criteria: (i) the qualified mobile device is located within one of the vehicles of the plurality of vehicles, (ii) the qualified mobile device is configured and equipped to join the local network, and (iii) the qualified mobile device consents to join the local network; and
   adding the set of qualified mobile device(s) to the local network.

2. The CIM of claim 1 further comprising using a first qualified mobile device of the set of qualified mobile device(s) to:
   receive data from a wide area network; and
   provide the data, through the local network, to a first onboard vehicle computer of the plurality of onboard vehicle computers.

3. The CIM of claim 1 further comprising:
   determining that a first vehicle onboard computer of the plurality of vehicle onboard computers is potentially experiencing a low bandwidth condition;
   responsive to the determination that the first vehicle onboard computer is potentially experiencing a low bandwidth condition, using a first qualified mobile device of the set of qualified mobile device(s) to:
   receive data from a wide area network, and
   provide the data, through the local network, to the first onboard vehicle computer.

4. The CIM of claim 1 wherein the set of qualified mobile device(s) includes a first qualified mobile device and a second qualified mobile device, the CIM further comprising:
   communicating data, over the local network, between the first and second qualified mobile devices.

5. The CIM of claim 1 wherein the local network is a Wi-Fi type network.

6. The CIM of claim 1 wherein the plurality of vehicles includes at least one self-driving road vehicle.

7. A computer program product (CPP) comprising:
   a set of storage device(s); and
   computer code stored collectively in the set of storage device(s), with the computer code including data and instructions to cause a processor(s) set to perform at least the following operations:
   establishing a local communication network among and between a plurality of onboard vehicle computers respectively located in a plurality of vehicles,
   polling the vicinity of each vehicle to determine a set of qualified mobile device(s) that meet the following criteria: (i) the qualified mobile device is located within one of the vehicles of the plurality of vehicles, (ii) the qualified mobile device is configured and equipped to join the local network, and (iii) the qualified mobile device consents to join the local network, and
   adding the set of qualified mobile device(s) to the local network.

8. The CPP of claim 7 wherein the computer code further includes instructions for causing the processor(s) set to perform the following operation(s) using a first qualified mobile device of the set of qualified mobile device(s) to:
   receive data from a wide area network; and
   provide the data, through the local network, to a first onboard vehicle computer of the plurality of onboard vehicle computers.

9. The CPP of claim 7 wherein the computer code further includes instructions for causing the processor(s) set to perform the following operation(s):
   determining that a first vehicle onboard computer of the plurality of vehicle onboard computers is potentially experiencing a low bandwidth condition;
   responsive to the determination that the first vehicle onboard computer is potentially experiencing a low bandwidth condition, using a first qualified mobile device of the set of qualified mobile device(s) to:
   receive data from a wide area network, and
   provide the data, through the local network, to the first onboard vehicle computer.

10. The CPP of claim 7 wherein the set of qualified mobile device(s) includes a first qualified mobile device and a second qualified mobile device, the CIM further comprising:
    communicating data, over the local network, between the first and second qualified mobile devices.

11. The CPP of claim 7 wherein the local network is a Wi-Fi type network.

12. The CPP of claim 7 wherein the plurality of vehicles includes at least one self-driving road vehicle.

13. A computer system (CS) comprising:
a processor(s) set;
a set of storage device(s); and
computer code stored collectively in the set of storage device(s), with the computer code including data and instructions to cause the processor(s) set to perform at least the following operations:
establishing a local communication network among and between a plurality of onboard vehicle computers respectively located in a plurality of vehicles,
polling the vicinity of each vehicle to determine a set of qualified mobile device(s) that meet the following criteria: (i) the qualified mobile device is located within one of the vehicles of the plurality of vehicles, (ii) the qualified mobile device is configured and equipped to join the local network, and (iii) the qualified mobile device consents to join the local network, and
adding the set of qualified mobile device(s) to the local network.

14. The CS of claim 13 wherein the computer code further includes instructions for causing the processor(s) set to perform the following operation(s) using a first qualified mobile device of the set of qualified mobile device(s) to:
receive data from a wide area network; and
provide the data, through the local network, to a first onboard vehicle computer of the plurality of onboard vehicle computers.

15. The CS of claim 13 wherein the computer code further includes instructions for causing the processor(s) set to perform the following operation(s):
determining that a first vehicle onboard computer of the plurality of vehicle onboard computers is potentially experiencing a low bandwidth condition;
responsive to the determination that the first vehicle onboard computer is potentially experiencing a low bandwidth condition, using a first qualified mobile device of the set of qualified mobile device(s) to:
receive data from a wide area network, and
provide the data, through the local network, to the first onboard vehicle computer.

16. The CS of claim 13 wherein the set of qualified mobile device(s) includes a first qualified mobile device and a second qualified mobile device, the CIM further comprising:
communicating data, over the local network, between the first and second qualified mobile devices.

17. The CS of claim 13 wherein the local network is a Wi-Fi type network.

18. The CS of claim 13 wherein the plurality of vehicles includes at least one self-driving road vehicle.

* * * * *